US010777168B2

(12) United States Patent
Han et al.

(10) Patent No.: US 10,777,168 B2
(45) Date of Patent: Sep. 15, 2020

(54) DISPLAY PANEL, DISPLAY DEVICE, AND METHOD FOR ADJUSTING DISPLAY PANEL

(71) Applicants: Chengdu BOE Optoelectronics Technology Co., Ltd., Chengdu, Sichuan Province (CN); BOE Technology Group Co., Ltd., Beijing (CN)

(72) Inventors: Guangguang Han, Beijing (CN); Zhiguang Zhang, Beijing (CN); Dehua Zhang, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/536,505

(22) Filed: Aug. 9, 2019

(65) Prior Publication Data

US 2020/0160814 A1 May 21, 2020

(30) Foreign Application Priority Data

Nov. 16, 2018 (CN) .......................... 2018 1 1366912

(51) Int. Cl.
*G06F 3/041* (2006.01)
*G09G 5/10* (2006.01)
*G06K 9/00* (2006.01)

(52) U.S. Cl.
CPC ........... *G09G 5/10* (2013.01); *G06K 9/00046* (2013.01); *G09G 2320/0626* (2013.01)

(58) Field of Classification Search
CPC ... G09G 2320/0626; G09G 2320/0233; G09G 2320/0686; G09G 2360/14;
(Continued)

(56) References Cited

U.S. PATENT DOCUMENTS

2008/0267467 A1 10/2008 Sokulin et al.
2017/0228580 A1 8/2017 Li et al.
(Continued)

FOREIGN PATENT DOCUMENTS

CN 101414443 A 4/2009
CN 106157897 A 11/2016
(Continued)

OTHER PUBLICATIONS

Chinese Office Action dated Dec. 31, 2019 in related Chinese Application No. 201811366912.5.

*Primary Examiner* — Dennis P Joseph
(74) *Attorney, Agent, or Firm* — Arent Fox LLP; Michael Fainberg

(57) ABSTRACT

The disclosure discloses a display panel, a display device, and a method for adjusting a display image, the method includes: receiving a display mode switching instruction; obtaining a first brightness value of a first pixel in a display area in the first mode, and determining a second brightness value of the first pixel in a second mode to be switched to, wherein the display area includes a fingerprint recognition area, and an image display area surrounding the fingerprint recognition area, and the first pixel is in the image display area; determining a brightness compensation coefficient of the image display area in the second mode according to the first brightness value and the second brightness value; and switching from the first mode to the second mode, and displaying an image in the second mode after compensating for brightness in the image display area using the brightness compensation coefficient.

16 Claims, 3 Drawing Sheets

AA1
P1
AA
AA2
P2

(58) Field of Classification Search
CPC ........ G09G 2360/145; G09G 2360/147; G06F 3/0416; G06F 3/041; G06F 3/0412
See application file for complete search history.

(56) References Cited

U.S. PATENT DOCUMENTS

2018/0308429 A1 10/2018 Meng et al.
2019/0114458 A1* 4/2019 Cho .................... G06K 9/2036
2019/0279580 A1* 9/2019 Noh .................... G09G 3/3413
2020/0027392 A1* 1/2020 Xu ...................... G09G 3/3266

FOREIGN PATENT DOCUMENTS

| | | | |
|---|---|---|---|
| CN | 107798303 | A | 3/2018 |
| CN | 1078456368 | A | 3/2018 |
| CN | 108399890 | A | 8/2018 |
| CN | 108510962 | A | 9/2018 |
| CN | 108665855 | A | 10/2018 |
| JP | 2008272473 | A | 11/2008 |

* cited by examiner

DISPLAY PANEL, DISPLAY DEVICE, AND METHOD FOR ADJUSTING DISPLAY PANEL

CROSS-REFERENCE TO RELATED APPLICATION

This application claims the priority of Chinese Patent Application No. 201811366912.5, filed with the Chinese Patent Office on Nov. 16, 2018, the content of which is hereby incorporated by reference in its entirety.

FIELD

The present disclosure relates to the field of display technologies, and particularly to a display panel, a display device, and a method for adjusting a display panel.

BACKGROUND

As smart mobile phones become popular, display devices with a large screen to panel ratio are be increasingly favored. A fingerprint recognition function is built in a display panel so that a space occupied by a fingerprint recognition module on the front face of a mobile phone can be dispensed with to thereby greatly improve the screen to panel ratio thereof. The existing applications for recognizing a fingerprint below a display panel are generally designed for an OLED display panel primarily because the OLED display panel supports self-emission display, where light emitted by the display panel can be reflected by a finger to reach a fingerprint recognition sensor located below the display panel so that the sensor can read fingerprint information formed as a result of optical reflection.

SUMMARY

Embodiments of the disclosure provide a display panel, a display device, and a method for adjusting a display image.

In an aspect, the embodiments of the disclosure provide a display panel, wherein the display panel comprising at least one processor and a memory, wherein the memory is configured to store readable program codes, and the at least one processor is configured to execute the readable program codes to:

receive a display mode switching instruction;

obtain a first brightness value of a first pixel in a display area in a first mode, and determine a second brightness value of the first pixel in a second mode to be switched to, wherein the display area comprises a fingerprint recognition area, and an image display area surrounding the fingerprint recognition area, and the first pixel is in the image display area;

determine a brightness compensation coefficient of the image display area in the second mode according to the first brightness value and the second brightness value; and switch from the first mode to the second mode, and display an image in the second mode after compensating for brightness in the image display area using the brightness compensation coefficient.

In some embodiments, in the display panel according to the embodiments of the disclosure, the at least one processor is further configured to execute the readable program codes to:

calculate the first brightness value $L_a$ of the first pixel in the display area in the first mode in an equation of:

$$L_a=P*L_{255}*(G_a/255)^{2.2},$$

wherein P represents a duty ratio of pulse width modulation, $L_{255}$ represents a brightness value at the grayscale 255 in the first mode, and $G_a$ represents a grayscale corresponding to the first brightness value.

In some embodiments, in the display panel according to the embodiments of the disclosure, the at least one processor is further configured to execute the readable program codes to:

determine a target brightness value of a second pixel in the fingerprint recognition area; and determine the second brightness value of the first pixel in the second mode according to the target brightness value of the second pixel.

In some embodiments, in the display panel according to the embodiments of the disclosure, the at least one processor is further configured to execute the readable program codes to:

calculate the second brightness value $L_b$ of the first pixel in the second mode in an equation of:

$$L_b=N*(G_b/255)^{2.2},$$

wherein N represents the target brightness value of the second pixel, and $G_b$ represents a grayscale corresponding to the second brightness value.

In some embodiments, in the display panel according to the embodiments of the disclosure, the at least one processor is further configured to execute the readable program codes to:

determine a first driving current value of a light-emitting element in the first mode according to the first brightness value, and determine a first data voltage value of the light-emitting element in the first mode according to the first driving current value;

determine a second driving current value of the light-emitting element in the second mode according to the second brightness value, and determine a second data voltage value of the light-emitting element in the second mode according to the second driving current value; and determine the brightness compensation coefficient of the image display area in the second mode according to the first data voltage value and the second data voltage value.

In some embodiments, in the display panel according to the embodiments of the disclosure, the at least one processor is further configured to execute the readable program codes to:

calculate the first driving current value $I_a$ of the light-emitting element in the first mode in an equation of:

$$I_a = \frac{L_a * S}{\eta * Ar},$$

wherein $L_a$ represents the first brightness value, S represents an area of a pixel definition layer in an area where the first pixel is located, Ar represents an opening ratio of the pixel definition layer, and represents a light-emission efficiency of the light-emitting element.

In some embodiments, in the display panel according to the embodiments of the disclosure, the at least one processor is further configured to execute the readable program codes to:

calculate the first data voltage value $V_a$ of the light-emitting element in the first mode in an equation of:

$$V_a = VDD - \sqrt{\frac{I_a}{k}},$$

wherein VDD represents a power voltage for driving the light-emitting element to emit light, $I_a$ represents the first driving current value, and k represents a coefficient of a driving transistor for driving the light-emitting element to emit light.

In some embodiments, in the display panel according to the embodiments of the disclosure, the at least one processor is further configured to execute the readable program codes to:

calculate the second driving current value $I_b$ of the light-emitting element in the second mode in the equation of:

$$I_b = \frac{L_b * S}{\eta * Ar},$$

wherein $L_b$ represents the second brightness value, S represents an area of a pixel definition layer in an area where the first pixel is located, Ar represents an opening ratio of the pixel definition layer, and η represents a light-emission efficiency of the light-emitting element; or the at least one processor is further configured to execute the readable program codes to: calculate the second data voltage value $V_a$ of the light-emitting element in the second mode in an equation of:

$$V_b = VDD - \sqrt{\frac{I_b}{k}},$$

wherein VDD represents a power voltage for driving the light-emitting element to emit light, $I_b$ represents the second driving current value, and k represents a coefficient of a driving transistor for driving the light-emitting element to emit light.

In some embodiments, in the display panel according to the embodiments of the disclosure, the at least one processor is further configured to execute the readable program codes to:

determine the brightness compensation coefficient as the ratio of the first data voltage value to the second data voltage value.

In another aspect, the embodiments of the disclosure provide a display device, the display device including the display panel above according to the embodiments of the disclosure.

In still another aspect, the embodiments of the disclosure provide a method for adjusting a display image, the method including:

receiving a display mode switching instruction;

obtaining a first brightness value of a first pixel in a display area in a first mode, and determining a second brightness value of the first pixel in a second mode to be switched to, wherein the display area includes a fingerprint recognition area, and an image display area surrounding the fingerprint recognition area, and the first pixel is in the image display area;

determining a brightness compensation coefficient of the image display area in the second mode according to the first brightness value and the second brightness value; and switching from the first mode to the second mode, and displaying an image in the second mode after compensating for brightness in the image display area using the brightness compensation coefficient.

In some embodiments, in the method above according to the embodiments of the disclosure, the obtaining the first brightness value of the first pixel in the display area in the first mode includes:

calculating the first brightness value $L_a$ of the first pixel in the display area in the first mode in an equation of:

$$L_a = P * L_{255} * (G_a/255)^{2.2},$$

wherein P represents a duty ratio of pulse width modulation, $L_{255}$ represents a brightness value at the grayscale 255 in the first mode, and $G_a$ represents a grayscale corresponding to the first brightness value.

In some embodiments, in the method above according to the embodiments of the disclosure, the determining the second brightness value of the first pixel in the second mode includes:

determining a target brightness value of a second pixel in the fingerprint recognition area; and determining the second brightness value of the first pixel in the second mode according to the target brightness value of the second pixel.

In some embodiments, in the method above according to the embodiments of the disclosure, the determining the second brightness value of the first pixel in the second mode according to the target brightness value of the second pixel includes:

calculating the second brightness value $L_b$ of the first pixel in the second mode in an equation of:

$$L_b = N * (G_b/255)^{2.2},$$

wherein N represents the target brightness value of the second pixel, and $G_b$ represents a grayscale corresponding to the second brightness value.

In some embodiments, in the method above according to the embodiments of the disclosure, the determining the brightness compensation coefficient of the image display area in the second mode according to the first brightness value and the second brightness value includes:

determining a first driving current value of a light-emitting element in the first mode according to the first brightness value, and determining a first data voltage value of the light-emitting element in the first mode according to the first driving current value;

determining a second driving current value of the light-emitting element in the second mode according to the second brightness value, and determining a second data voltage value of the light-emitting element in the second mode according to the second driving current value; and determining the brightness compensation coefficient of the image display area in the second mode according to the first data voltage value and the second data voltage value.

In some embodiments, in the method above according to the embodiments of the disclosure, the determining the first driving current value of the light-emitting element in the first mode according to the first brightness value includes:

calculating the first driving current value $I_a$ of the light-emitting element in the first mode in an equation of:

$$I_a = \frac{L_a * S}{\eta * Ar},$$

wherein $L_a$ represents the first brightness value, S represents an area of a pixel definition layer in an area where the first pixel is located, Ar represents an opening ratio of the pixel definition layer, and η represents a light-emission efficiency of the light-emitting element.

In some embodiments, in the method above according to the embodiments of the disclosure, the determining the first data voltage value of the light-emitting element in the first mode according to the first driving current value includes:

calculating the first data voltage value $V_a$ of the light-emitting element in the first mode in an equation of:

$$V_a = VDD - \sqrt{\frac{I_a}{k}},$$

wherein VDD represents a power voltage for driving the light-emitting element to emit light, $I_a$ represents the first driving current value, and k represents a coefficient of a driving transistor for driving the light-emitting element to emit light.

In some embodiments, in the method above according to the embodiments of the disclosure, the determining the second driving current value of the light-emitting element in the second mode according to the second brightness value includes:

calculating the second driving current value $I_b$ of the light-emitting element in the second mode in an equation of:

$$I_b = \frac{L_b * S}{\eta * Ar},$$

wherein $L_b$ represents the second brightness value, S represents an area of a pixel definition layer in an area where the first pixel is located, Ar represents an opening ratio of the pixel definition layer, and η represents a the light-emission efficiency of the light-emitting element.

In some embodiments, in the method above according to the embodiments of the disclosure, the determining the second data voltage value of the light-emitting element in the second mode according to the second driving current value includes:

calculating the second data voltage value $V_a$ of the light-emitting element in the second mode in an equation of:

$$V_b = VDD - \sqrt{\frac{I_b}{k}},$$

wherein VDD represents a power voltage for driving the light-emitting element to emit light, $I_b$ represents the second driving current value, and k represents a coefficient of a driving transistor for driving the light-emitting element to emit light.

In some embodiments, in the method above according to the embodiments of the disclosure, the determining the brightness compensation coefficient of the image display area in the second mode according to the first data voltage value and the second data voltage value includes:

determining the brightness compensation coefficient as the ratio of the first data voltage value to the second data voltage value.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

There remains some drawback in the existing function of recognizing a fingerprint below the display panel. Particularly a display area of the OLED display panel with the function of recognizing a fingerprint below the display panel includes a fingerprint recognition area and an image display area, and while the display panel is being switched between different display modes, the brightness of the image display area which is a background of the fingerprint recognition area (i.e., background brightness) may change dramatically, thus resulting in a visual impact on human eyes, and making the eyes unconformable.

Particular implementations of a method for adjusting a display image, a display panel, and a display device according to the embodiments of the disclosure will be described below in details with reference to the drawings. It shall be noted that the embodiments to be described are only a part but not all of the embodiments of the disclosure; and the embodiments of the disclosure, and the features in the embodiments can be combined with each other unless they conflict with each other. Moreover all the other embodiments of the disclosure which can readily occur to those ordinarily skilled in the art based upon the embodiments here of the disclosure without any inventive effort shall fall into the claimed scope of the disclosure.

Figure 1:
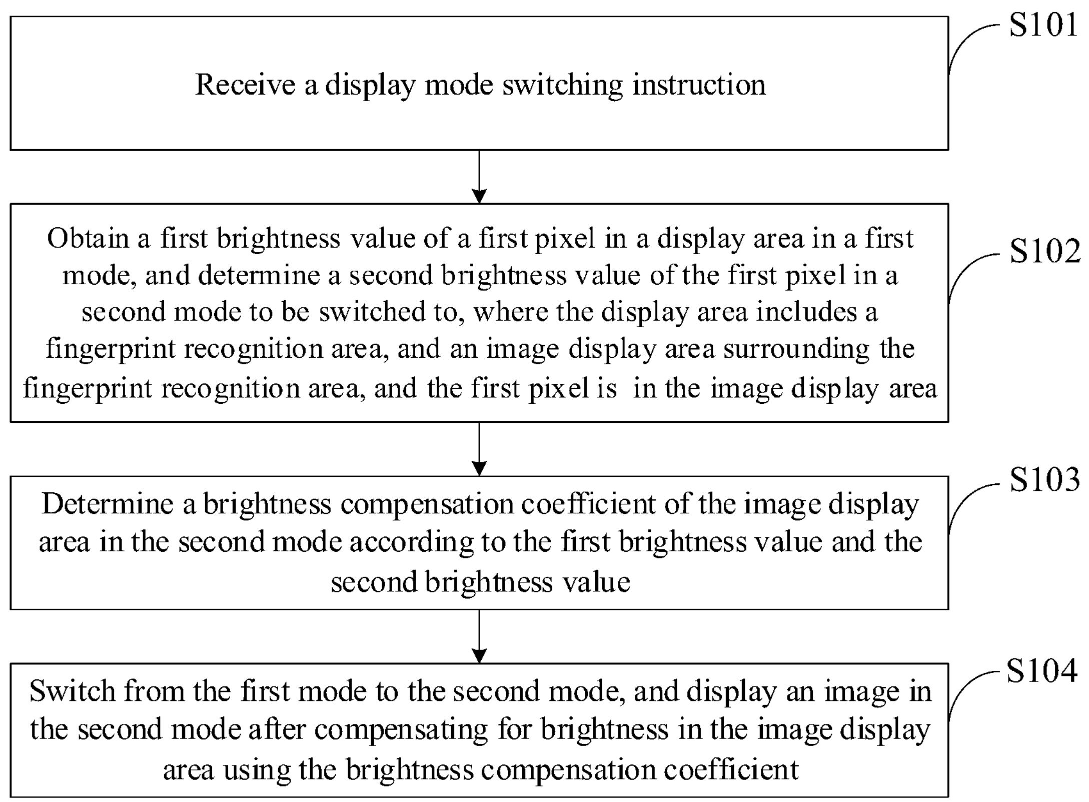
FIG. 1 is a flow chart of a method for adjusting a display image according to the embodiments of the disclosure.
Figure 2:
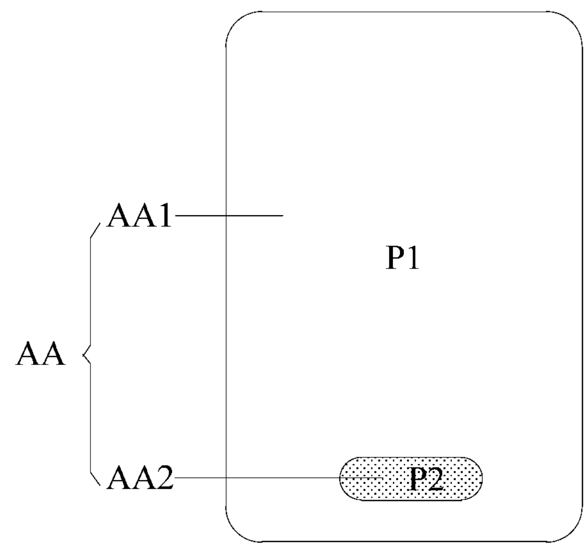
FIG. 2 is a schematic diagram of areas where a first pixel and a second pixel are located according to the embodiments of the disclosure.

As illustrated in FIG. 1, a method for adjusting a display panel according to the embodiments of the disclosure particularly can include the following steps:

step S101 is to receive a display mode switching instruction;

step S102 is to obtain a first brightness value of a first pixel in a display area in a first mode, and to determine a second brightness value of the first pixel in a second mode to be switched to, where the display area includes a fingerprint recognition area, and an image display area surrounding the fingerprint recognition area, and the first pixel is in the image display area; and in some embodiments, FIG. 2 illustrates a display area AA including an image display area AA1 and a fingerprint recognition area AA2, where a first pixel P1 is in the image display area AA1;

step S103 is to determine a brightness compensation coefficient of the image display area in the second mode according to the first brightness value and the second brightness value; and step S104 is to switch from the first mode to the second mode, and to display an image in the second mode after compensating for brightness in the image display area using the brightness compensation coefficient.

In the method above according to the embodiments of the disclosure, before the display mode is switched from the first mode to the second mode, the display image in the second mode to be switched to can be compensated for to thereby avoid the brightness of the display image from being changed dramatically, so as to guarantee a watching effect.

It shall be noted that in the method above according to the embodiments of the disclosure, the first mode and the second mode can be an Always On Display (AOD) mode, a Finger Print Sensor (FPS) mode, or a normal display mode, and there is the same display image in different display modes. For example, in order to pay on a mobile terminal, the mobile terminal shall be switched from the first mode (i.e., the normal display mode) to the second mode (i.e., the FPS mode), but a payment amount shall be displayed in the image display area in both of the two modes.

In some embodiments, since there is a linear relationship between a duty ratio of Pulse Width Modulation (PWM) and a brightness in a PWM dimming mode, the step S102 of obtaining the first brightness value of the first pixel in the display area in the first mode in the method above according to the embodiments of the disclosure can be performed particularly as follows.

The first brightness value $L_a$ of the first pixel in the display area in the first mode is calculated in an equation of:

$$L_a = P*L_{255}*(G_a/255)^{2.2},$$

Where P represents a duty ratio of pulse width modulation, $L_{255}$ represents a brightness value at the grayscale 255 in the first mode, and $G_a$ represents a grayscale corresponding to the first brightness value.

In some embodiments, in the method above according to the embodiments of the disclosure, the step S102 of determining the second brightness value of the first pixel in the second mode can be performed particularly as follows.

A target brightness value of a second pixel P2 in the fingerprint recognition area AA2 is determined as illustrated in FIG. 2; and in some embodiments, the target brightness value can be set as needed for a user, this value may constant in different display modes, and the target brightness value is typically higher than the brightness value in the image display area surrounding the fingerprint recognition area; and the second brightness value of the first pixel in the second mode is determined according to the target brightness value of the second pixel, that is, the second brightness value of the first pixel in the second mode is determined with reference to the target brightness value of the second pixel in the fingerprint recognition area.

As can be apparent from the description above, the target brightness value of the second pixel in the fingerprint recognition area is typically higher than the brightness value in the image display area, so in order to maximize the target brightness value of the second pixel, the duty ratio P of pulse width modulation can be set to 1 without considering an influence of pulse width modulation on brightness. Hereupon in some embodiments, in the method above according to the embodiments of the disclosure, the second brightness value of the first pixel in the second mode is determined according to the target brightness value of the second pixel particularly as follows.

The second brightness value $L_b$ of the first pixel in the second mode is calculated in an equation of:

$$L_b = N*(G_b/255)^{2.2}.$$

Where N represents the target brightness value of the second pixel, and $G_b$ represents a grayscale corresponding to the second brightness value.

In this way, the first brightness value $L_a$ of the first pixel in the first mode, and the second brightness value $L_b$ of the first pixel in the second mode which is not compensated for are determined. In order to avoid the brightness of the display image from being changed dramatically while switching from the first mode to the second mode, the compensation coefficient a can be calculated from the second brightness value $L_b$ and the first brightness value $L_a$ as $$a = \frac{L_a}{L_b} = \frac{P*L_{255}}{N}*\left(\frac{G_a}{G_b}\right)^{2.2},$$

and the display image in the second mode can be adjusted for display using the compensation coefficient a.

Figure 3:
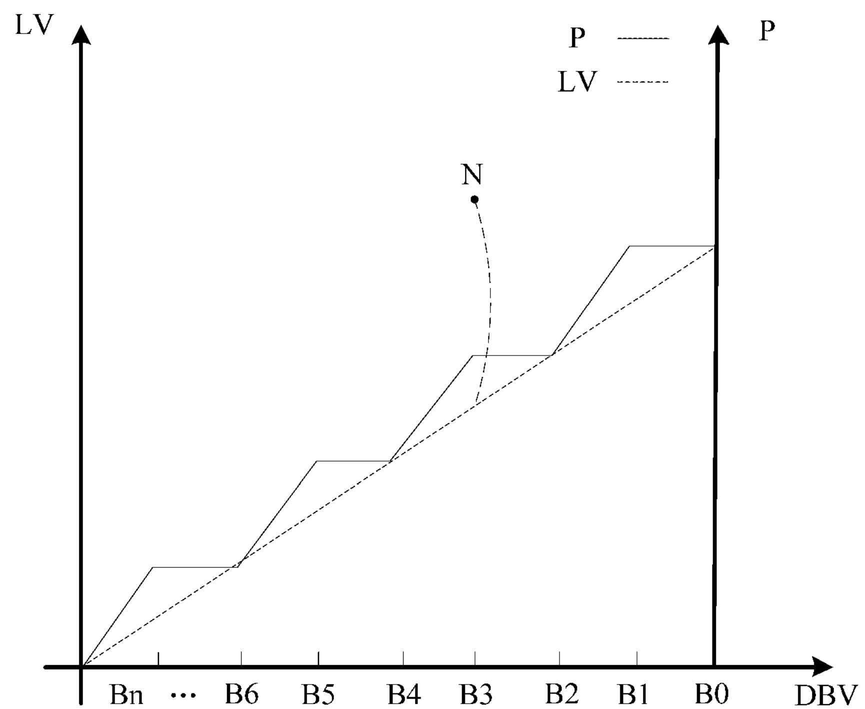
FIG. 3 is a schematic diagram of a principle for adjusting a display image according to the embodiments of the disclosure.
Figure 4:
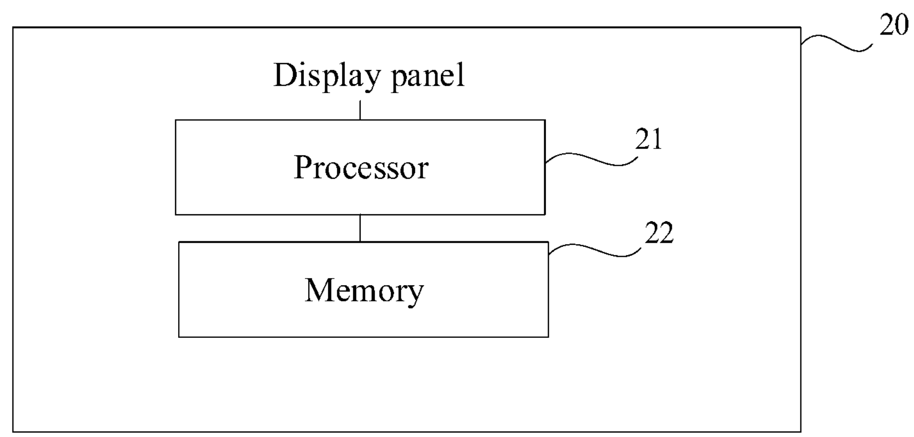
FIG. 4 is a schematic diagram of a structure of a display panel according to the embodiments of the disclosure.

FIG. 3 illustrates a schematic diagram of a principle of adjusting the brightness of a pixel in the image display area in details. In FIG. 3, DBV (Display Brightness Value) represents a display brightness value of the pixel, and the display brightness value is represented by B0, B1, . . . , Bn, where n is a positive integer greater than or equal to 1; LV represents backlight brightness, P represents a duty ratio of pulse width modulation for a light-emitting device corresponding to the pixel, and N represents a target brightness value of the pixel. The polyline indicated by the solid line in FIG. 3 refers to a curve in which P changes with DBV, and the straight line indicated by the dotted line in FIG. 3 refers to a curve in which LV changes with DBV. Since the brightness of the pixel depends upon data voltage, power voltage, reference voltage, and other factors, the brightness can be compensated for by adjusting one or more of the factors above. Of course, the brightness can alternatively be compensated for by adjusting one or more other brightness dominating factors well known to those skilled in the art, although the embodiments of the disclosure will not be limited thereto.

In some embodiments, in the method above according to the embodiments of the disclosure, the brightness compensation coefficient of the image display area in the second mode can be determined according to the first brightness value and the second brightness value particularly as follows.

A first driving current value of a light-emitting element in the first mode is determined according to the first brightness value, and a first data voltage value of the light-emitting element in the first mode is determined according to the first driving current value. A second driving current value of the light-emitting element in the second mode is determined according to the second brightness value, and a second data voltage value of the light-emitting element in the second mode is determined according to the second driving current value. And the brightness compensation coefficient of the image display area in the second mode is determined according to the first data voltage value and the second data voltage value.

Here the first driving current value of the light-emitting element in the first mode is determined to the first brightness value particularly as follow.

The first driving current value $I_a$ of the light-emitting element in the first mode is calculated in an equation of:

$$I_a = \frac{L_a*S}{\eta*Ar}.$$

Where $L_a$ represents the first brightness value, S represents an area of a pixel definition layer in an area where the first pixel is located, Ar represents an opening ratio of the pixel definition layer, and η represents a light-emission efficiency of the light-emitting element.

The first data voltage value of the light-emitting element in the first mode is determined according to the first driving current value particularly as follows.

The first data voltage value $V_a$ of the light-emitting element in the first mode is calculated in an equation of:

$$V_a = VDD - \sqrt{\frac{I_a}{k}}.$$

Where VDD represents a power voltage for driving the light-emitting element to emit light, $I_a$ represents the first driving current value, and k represents a coefficient of a driving transistor for driving the light-emitting element to emit light.

The second driving current value of the light-emitting element in the second mode is determined to the second brightness value particularly as follow.

The second driving current value $I_b$ of the light-emitting element in the second mode is calculated in an equation of:

$$I_b = \frac{L_b * S}{\eta * Ar}.$$

Where $L_b$ represents the second brightness value, S represents an area of a pixel definition layer in an area where the first pixel is located, Ar represents an opening ratio of the pixel definition layer, and η represents a light-emission efficiency of the light-emitting element.

The second data voltage value of the light-emitting element in the second mode is determined according to the second driving current value particularly as follows.

The second data voltage value $V_b$ of the light-emitting element in the second mode is calculated in an equation of:

$$V_b = VDD - \sqrt{\frac{I_b}{k}}.$$

Where VDD represents the power voltage for driving the light-emitting element to emit light, $I_b$ represents the second driving current value, and k represents the coefficient of the driving transistor for driving the light-emitting element to emit light.

The brightness compensation coefficient of the image display area in the second mode is determined according to the first data voltage value and the second data voltage value particularly as follows.

The brightness compensation coefficient is determined as the ratio of the first data voltage value to the second data voltage value.

As can be apparent from the description above, the brightness compensation coefficient b determined as the ratio of the first data voltage value $V_a$ to the second data voltage value $V_b$ is represented in the equation of:

$$b = \frac{VDD - \left(\frac{G_a}{255}\right)^{1.1} * \sqrt{\frac{P * L_{255} * S}{k * \eta * Ar}}}{VDD - \left(\frac{G_b}{255}\right)^{1.1} * \sqrt{\frac{N * S}{k * \eta * Ar}}}.$$

Accordingly in order to compensate for the display image in the second mode, in a possible implementation, the brightness is adjusted using the brightness compensation coefficient b represented in the equation above to thereby avoid the brightness of the display image from being changed dramatically while switching from the first mode to the second mode, so as to guarantee the conformity of the watching user.

Based upon the same inventive idea, the embodiments of the disclosure provides a display panel 20, wherein the display panel 20 comprises at least one processor 21 and a memory 22, wherein the memory 22 is configured to store readable program codes, and the at least one processor 21 is configured to execute the readable program codes to perform the method above. The repeated description is not repeated herein.

In some embodiments, the display panel is an OLED display panel with a function of recognizing a fingerprint below the display panel, and a display image of the display panel is adjusted using the method above. Since the display panel addresses the problem under a similar principle to the method above, reference can be made to the implementation of the method above according to the embodiments of the disclosure for an implementation of the display panel according to the embodiments of the disclosure, and a repeated description thereof will be omitted here.

Based upon the same inventive idea, the embodiments of the disclosure further provide a display device including the display panel above according to the embodiments of the disclosure. The display device can be a mobile phone, a tablet computer, a TV set, a monitor, a notebook computer, a digital photo frame, a navigator, a smart watch, a gym wrist band, a personal digital assistant, an automatic teller machine, or any other product or component with a display function. All the other components indispensable to the display device shall readily occur to those ordinarily skilled in the art, so a repeated description thereof will be omitted here, and the embodiments of the disclosure will not be limited thereto. Reference can be made to the embodiments of the display panel above for an implementation of the display device, and a repeated description thereof will be omitted here.

It shall be noted that in this context, the relationship terms, e.g., the first, the second, etc., are only intended to distinguish one entity or operation from another entity or operation, but shall not require or suggest the presence of any such real relationship or order between these entities or operations.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A display panel, wherein the display panel comprising at least one processor and a memory, wherein the memory is configured to store readable program codes, and the at least one processor is configured to execute the readable program codes to:

receive a display mode switching instruction;

obtain a first brightness value of a first pixel in a display area in a first mode, and determine a second brightness value of the first pixel in a second mode to be switched to, wherein the display area comprises a fingerprint recognition area, and an image display area surrounding the fingerprint recognition area, and the first pixel is in the image display area;

determine a brightness compensation coefficient of the image display area in the second mode according to the first brightness value and the second brightness value; and switch from the first mode to the second mode, and display an image in the second mode after compensating for brightness in the image display area using the brightness compensation coefficient;

wherein the at least one processor is further configured to execute the readable program codes to:

determine a target brightness value of a second pixel in the fingerprint recognition area; and determine the second brightness value of the first pixel in the second mode according to the target brightness value of the second pixel; and wherein the at least one processor is further configured to execute the readable program codes to:

calculate the second brightness value $L_b$ of the first pixel in the second mode in an equation of:

$$L_b=N*(G_b/255)^{2.2},$$

wherein N represents the target brightness value of the second pixel, and $G_b$ represents a grayscale corresponding to the second brightness value.

2. The display panel according to claim 1, wherein the at least one processor is further configured to execute the readable program codes to:

calculate the first brightness value $L_a$ of the first pixel in the display area in the first mode in an equation of:

$$L_a=P*L_{255}*(G_a/255)^{2.2},$$

wherein P represents a duty ratio of pulse width modulation, $L_{255}$ represents a brightness value at the grayscale 255 in the first mode, and $G_a$ represents a grayscale corresponding to the first brightness value.

3. The display panel according claim 1, wherein the at least one processor is further configured to execute the readable program codes to:

determine a first driving current value of a light-emitting element in the first mode according to the first brightness value, and determine a first data voltage value of the light-emitting element in the first mode according to the first driving current value;

determine a second driving current value of the light-emitting element in the second mode according to the second brightness value, and determine a second data voltage value of the light-emitting element in the second mode according to the second driving current value; and determine the brightness compensation coefficient of the image display area in the second mode according to the first data voltage value and the second data voltage value.

4. The display panel according to claim 3, wherein the at least one processor is further configured to execute the readable program codes to:

calculate the first driving current value $I_a$ of the light-emitting element in the first mode in an equation of:

$$I_a=\frac{L_a*S}{\eta*Ar},$$

wherein $L_a$ represents the first brightness value, S represents an area of a pixel definition layer in an area where the first pixel is located, Ar represents an opening ratio of the pixel definition layer, and η represents a light-emission efficiency of the light-emitting element.

5. The display panel according to claim 3, wherein the at least one processor is further configured to execute the readable program codes to:

calculate the first data voltage value $V_a$ of the light-emitting element in the first mode in an equation of:

$$V_a=VDD-\sqrt{\frac{I_a}{k}},$$

wherein VDD represents a power voltage for driving the light-emitting element to emit light, $I_a$ represents the first driving current value, and k represents a coefficient of a driving transistor for driving the light-emitting element to emit light.

6. The display panel according to claim 3, wherein the at least one processor is further configured to execute the readable program codes to:

calculate the second driving current value $I_b$ of the light-emitting element in the second mode in the equation of:

$$I_b=\frac{L_b*S}{\eta*Ar},$$

wherein $L_b$ represents the second brightness value, S represents an area of a pixel definition layer in an area where the first pixel is located, Ar represents an opening ratio of the pixel definition layer, and η represents a light-emission efficiency of the light-emitting element; or the at least one processor is further configured to execute the readable program codes to: calculate the second data voltage value $V_a$ of the light-emitting element in the second mode in an equation of:

$$V_b=VDD-\sqrt{\frac{I_b}{k}},$$

wherein VDD represents a power voltage for driving the light-emitting element to emit light, $I_b$ represents the second driving current value, and k represents a coefficient of a driving transistor for driving the light-emitting element to emit light.

7. The display panel according to claim 3, wherein the at least one processor is further configured to execute the readable program codes to:

determine the brightness compensation coefficient as the ratio of the first data voltage value to the second data voltage value.

8. A display device, comprising the display panel according to claim 1.

9. A method for adjusting a display image, the method comprising:

receiving a display mode switching instruction;

obtaining a first brightness value of a first pixel in a display area in a first mode, and determining a second brightness value of the first pixel in a second mode to be switched to, wherein the display area comprises a fingerprint recognition area, and an image display area surrounding the fingerprint recognition area, and the first pixel is in the image display area;

determining a brightness compensation coefficient of the image display area in the second mode according to the first brightness value and the second brightness value; and switching from the first mode to the second mode, and displaying an image in the second mode after compensating for brightness in the image display area using the brightness compensation coefficient;

wherein the determining the second brightness value of the first pixel in the second mode comprises:

determining a target brightness value of a second pixel in the fingerprint recognition area; and determining the second brightness value of the first pixel in the second mode according to the target brightness value of the second pixel; and wherein the determining the second brightness value of the first pixel in the second mode according to the target brightness value of the second pixel comprises: calculating the second brightness value $L_b$ of the first pixel in the second mode in an equation of:

$$L_b=N*(G_b/255)^{2.2},$$

wherein N represents the target brightness value of the second pixel, and $G_b$ represents a grayscale corresponding to the second brightness value.

10. The method according to claim 9, wherein the obtaining the first brightness value of the first pixel in the display area in the first mode comprises:

calculating the first brightness value $L_a$ of the first pixel in the display area in the first mode in an equation of:

$$L_a=P*L_{255}*(G_a/255)^{2.2},$$

wherein P represents a duty ratio of pulse width modulation, $L_{255}$ represents a brightness value at the grayscale 255 in the first mode, and $G_a$ represents a grayscale corresponding to the first brightness value.

11. The method according to claim 9, wherein the determining the brightness compensation coefficient of the image display area in the second mode according to the first brightness value and the second brightness value comprises:

determining a first driving current value of a light-emitting element in the first mode according to the first brightness value, and determining a first data voltage value of the light-emitting element in the first mode according to the first driving current value;

determining a second driving current value of the light-emitting element in the second mode according to the second brightness value, and determining a second data voltage value of the light-emitting element in the second mode according to the second driving current value; and determining the brightness compensation coefficient of the image display area in the second mode according to the first data voltage value and the second data voltage value.

12. The method according to claim 11, wherein the determining the first driving current value of the light-emitting element in the first mode according to the first brightness value comprises:

calculating the first driving current value $I_a$ of the light-emitting element in the first mode in an equation of:

$$I_a = \frac{L_a * S}{\eta * Ar},$$

wherein $L_a$ represents the first brightness value, S represents an area of a pixel definition layer in an area where the first pixel is located, Ar represents an opening ratio of the pixel definition layer, and η represents a light-emission efficiency of the light-emitting element.

13. The method according to claim 11, wherein the determining the first data voltage value of the light-emitting element in the first mode according to the first driving current value comprises:

calculating the first data voltage value $V_a$ of the light-emitting element in the first mode in an equation of:

$$V_a = VDD - \sqrt{\frac{I_a}{k}},$$

wherein VDD represents a power voltage for driving the light-emitting element to emit light, $I_a$ represents the first driving current value, and k represents a coefficient of a driving transistor for driving the light-emitting element to emit light.

14. The method according to claim 11, wherein the determining the second driving current value of the light-emitting element in the second mode according to the second brightness value comprises:

calculating the second driving current value $I_b$ of the light-emitting element in the second mode in an equation of:

$$I_b = \frac{L_b * S}{\eta * Ar},$$

wherein $L_b$ represents the second brightness value, S represents an area of a pixel definition layer in an area where the first pixel is located, Ar represents an opening ratio of the pixel definition layer, and represents a light-emission efficiency of the light-emitting element.

15. The method according to claim 11, wherein the determining the second data voltage value of the light-emitting element in the second mode according to the second driving current value comprises:

calculating the second data voltage value $V_a$ of the light-emitting element in the second mode in an equation of:

$$V_b = VDD - \sqrt{\frac{I_b}{k}},$$

wherein VDD represents a power voltage for driving the light-emitting element to emit light, $I_b$ represents the second driving current value, and k represents a coefficient of a driving transistor for driving the light-emitting element to emit light.

16. The method according to claim 11, wherein the determining the brightness compensation coefficient of the image display area in the second mode according to the first data voltage value and the second data voltage value comprises:

determining the brightness compensation coefficient as the ratio of the first data voltage value to the second data voltage value.

* * * * *